United States Patent [19]

Sarkkinen et al.

[11] Patent Number: 5,485,412
[45] Date of Patent: Jan. 16, 1996

[54] METHOD AND APPARATUS FOR SUCCESSIVE HORIZONTAL AND VERTICAL DATA FILTERING

[75] Inventors: Timo Sarkkinen, Kempele; Pertti Alapuranen, Kontio; Kari Tiensyrjä, Oulu, all of Finland

[73] Assignee: Rautaruukki Oy, Oulu, Finland

[21] Appl. No.: 326,294

[22] Filed: Oct. 20, 1994

[30] Foreign Application Priority Data

Oct. 29, 1993 [JP] Japan ......................................... 934807

[51] Int. Cl.$^6$ .................................................. G06F 15/31
[52] U.S. Cl. ................................................... 364/724.05
[58] Field of Search ........................................ 364/724.05

[56] References Cited

U.S. PATENT DOCUMENTS

| | | | |
|---|---|---|---|
| 4,328,426 | 5/1982 | D'Ortenzio | 364/724.05 |
| 4,471,381 | 1/1984 | Kasuga et al. | 358/140 |
| 4,709,394 | 11/1987 | Bessler et al. | 364/724.05 |
| 4,821,223 | 4/1989 | David | 364/724.05 |
| 4,847,691 | 7/1989 | Barton et al. | 358/160 |
| 4,941,191 | 7/1990 | Miller et al. | 364/724.05 |
| 4,984,286 | 1/1991 | Dolazza | 382/54 |
| 5,117,289 | 5/1992 | Farley et al. | 358/140 |
| 5,349,547 | 9/1994 | Harrand | 364/724.05 |

FOREIGN PATENT DOCUMENTS

| | | |
|---|---|---|
| 0045596 | 2/1982 | European Pat. Off. . |
| 0550166 | 7/1993 | European Pat. Off. . |

OTHER PUBLICATIONS

Dialog Abstract, Proceedings of the SPIE–The International Society for Optical Engineering, vol. 974, pp. 315–323, published 1988.

Dialog Abstract, Signal Processing: Image Communication, vol. 2, No. 3, pp. 333–341, published Oct. 1990.

Multidimensional Digital Signal Processing, D. E. Dudgeon, Russell M. Mersereau, Prentice–Hall Signal Processing Series, pp. 5–12, and 116–118, 1984.

Advanced Topics in Signal Processing, Jae S. Lim and Alan V. Oppenheim, prentice Hall Signal Processing Series, pp. 385–389, 1988.

Primary Examiner—Tan V. Mai
Attorney, Agent, or Firm—Sughrue, Mion, Zinn, Macpeak and Seas

[57] ABSTRACT

A method and a filter for continuous two-dimensional filtering of discrete m*n data to be processed having n lines each containing m data samples. The filter includes a horizontal filter HF and a vertical filter VF for performing the filtering as successive horizontal and vertical filtering operations for data divided for the processing into blocks having y lines. The filter further includes a first memory M1 for storing horizontal-filtered data to be received from the horizontal filter, a second memory M2 for storing internal intermediate states of the vertical filter, and a timing and synchronizing block TSC for generating address signals A1, A2 and control signals C1, C2 for storing in the first memory and for reading therefrom as well as for storing in the second memory and for reading therefrom.

8 Claims, 3 Drawing Sheets

| 0 | 1 | 2 | 3 | ... | m-2 | m-1 |
| m | m+1 | m+2 | m+3 | ... | 2m-2 | 2m-1 |
| 2m | 2m+1 | 2m+2 | 2m+3 | ... | 3m-2 | 3m-1 |
| 3m | 3m+1 | 3m+2 | 3m+3 | ... | 4m-2 | 4m-1 |
| ............ | ............ | ............ | ............ | ............ | ............ | ............ |
| (y-1)m | (y-1)m+1 | (y-1)m+2 | | ... | ym-2 | ym-1 | m COLUMNS

STORAGE BLOCK 1
(RED STAGE)

y LINES

STORAGE BLOCK 2
(WRITE STAGE)

y LINES

METHOD AND APPARATUS FOR SUCCESSIVE HORIZONTAL AND VERTICAL DATA FILTERING

BACKGROUND OF THE INVENTION

The present invention relates to a method of continuous two-dimensional filtering of discrete m*n data, the data to be processed comprising n lines each containing m data samples, in which method the filtering is performed as successive horizontal and vertical filtering operations and the data is divided for the processing into blocks comprising y lines. The invention also relates to a filter implementing the method.

Two-dimensional discrete m*n data is a set of data samples of variable value, expressed with e.g. 8 data bits, and arranged in ordered pairs of integers m and n in such a way that there are n (1<n<∞) lines containing m data samples (1<m<M, where M is a number defined by application needs and technological limits). Public signal processing literature (e.g. D. E. Dudgeon, R. M. Mersereau: Multidimensional Digital Signal Processing. Prentice-Hall, Inc., Englewood Cliffs, N.J. 07632, 1984, pp. 5 to 12, 116 to 118, and J. S. Lim, A. V. Oppenheim: Advanced Topics in Signal Processing. Prentice-Hall, Inc., Englewood Cliffs, N.J. 07632, 1988, pp. 385 to 389) presents practical procedures for continuous two-dimensional filtering of m*n data, for instance overlap-add and overlap-save methods, based on discrete Fourier transformation and derivatives thereof, the methods utilizing the properties of separable systems. These methods process m*n data as blocks, causing detrimental discontinuity in several real-time applications and requiring substantial storage capacity for storing data samples and intermediate results and requiring a transposition of the intermediate results. In conferences and publications, an abundance of solutions implementing a two-dimensional discrete cosine transform have been presented and suggested to be used in HDTV systems, the solutions being based on the above principles.

SUMMARY OF THE INVENTION

The object of the present invention is to provide a method and a filter for continuous two-dimensional filtering of discrete m*n data, not comprising the problems of the above-mentioned known methods especially in the form of large storage capacity or discontinuity of results. This object is achieved by means of the method according to the invention, comprising the steps of filtering a data block comprising y lines in the horizontal direction, storing the results of the horizontal filtering by lines in a first memory, the memory each time containing y stored lines of the results of the horizontal filtering, reading the results of the horizontal filtering from the first memory by columns along the length of the block, filtering the results read from the first memory by columns in the vertical direction, which results of the vertical filtering constitute filtered data, storing intermediate states of the vertical filtering in a second memory, upon processing the y lines of each column, reading from the second memory, before the vertical filtering of next block, the y lines earlier state of the corresponding column to be the initial value of the vertical filtering and continuing the blockwise processing until n data lines have been filtered.

When the method according to the invention is applied, it is preferable that the results of the horizontal filtering are initially written in successive memory locations until all memory locations are in use, and subsequently, the results are written in place of the content of the memory location just read to the vertical filtering. In practice, it is also preferable to proceed in such a way that the storing of the results of the vertical filtering in the memory and the loading of the values to be the initial values of the vertical filtering from the memory are combined by changing the contents of the memory locations to be read for those to be stored.

For the implementation of the above method, a filter can be used, which comprises a horizontal filter and a vertical filter for performing the filtering as successive horizontal and vertical filtering operations for the data divided for the processing into blocks comprising y lines, a first memory for storing horizon- tal-filtered data to be received from the horizontal filter, a second memory for storing internal intermediate states of the vertical filter. This filter is characterized in that it further comprises a timing and synchronizing block for generating address signals and control signals for storing in the first memory by lines and for reading from the first memory by columns as well as for storing the intermediate states of the vertical filtering in the second memory and for reading the intermediate states from the second memory.

The size of the first memory is preferably 2*m*y memory units divided into two parts in size of m*y, one of them each time serving as a write memory, to which data is written by lines, and the other one as a read memory, from which data is read by columns.

BRIEF DESCRIPTION OF THE DRAWINGS

In the following, the method and the filter according to the invention will be described in more detail with reference to the attached drawing, in which.

DESCRIPTION OF THE PREFERRED EMBODIMENTS

Figure 1:
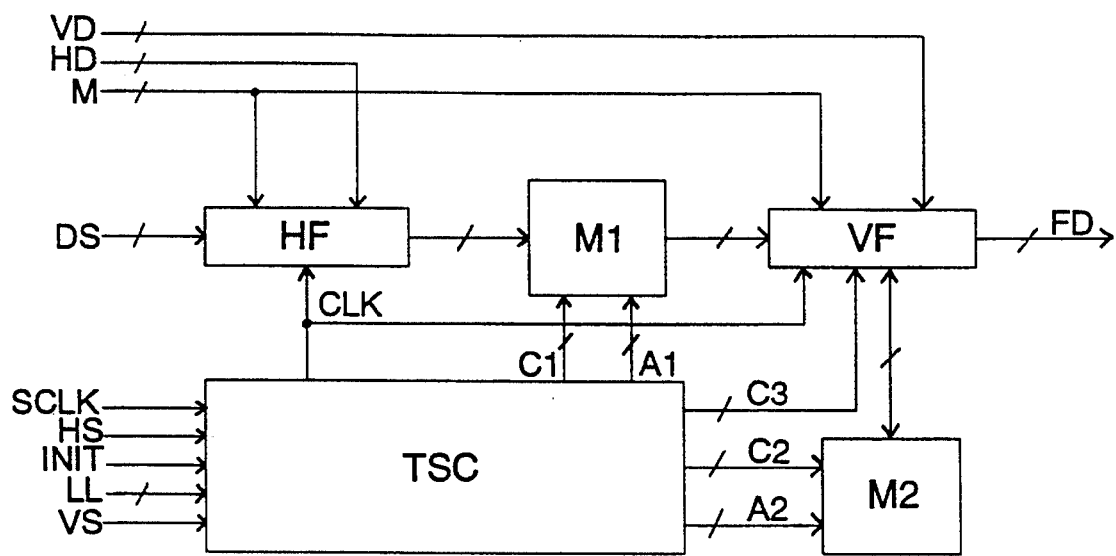
FIG. 1 shows an illustrative block diagram of a filter implementing the method according to the invention.

FIG. 1 illustrates the structure of a filter implementing a method according to the invention, as an example. It is based on a utilization of the properties of separable systems, and conventional known horizontal and vertical filters, such as filter structures known e.g. from WO Patent Application 92/21093, may be used as a horizontal filter HF and a vertical filter VF. In the filter shown in FIG. 1, incoming data samples DS are fed directly to the horizontal filter HF. Upon horizontal filtering, intermediate results are stored in a memory M1, under control of an address signal A1 and a control signal C1 generated by a timing and synchronizing block TSC, and subsequently, the original data sample is deleted from the processing and the processing is repeated for new data samples DS. Each time, y*m intermediate results of horizontal filtering are in storage. Then an intermediate result is read from the memory M1 to the vertical filter VF, under control of the address signals A1 and control signals C1 generated by the timing and synchronizing block TSC, the memory location occupied by said intermediate result being simultaneously freed for the next intermediate result of the horizontal filter. Intermediate results of the vertical filter VF are stored in a memory M2. From this memory M2, internal intermediate states of the vertical filter VF are restored in order to provide a continuity between successive blocks comprising y lines. The memory M2 contains y*m intermediate states at a time. The indications used in the illustrative block diagram of FIG. 1 are as follows:

A1=address signals for M1
A2=address signals for M2
CLK=clock signals for HF and VF
C1=control signals for M1
C2=control signals for M2
C3=control signals for VF
DS=incoming data samples
FD=outgoing filtered data
HD=dimension of HF
HF=horizontal filter
HS=horizontal synchronization
INIT=initial setting signal
LL=line length
M=setting of operating space for HF and VF
M1=memory 1
M2=memory 2
SCLK=clock signal
TSC=timing and synchronizing block
VD=dimension of VF
VF=vertical filter
VS=vertical synchronization Operating principles of the illustrative embodiment of the filter shown in FIG. 1 and the filtering method itself are described below by using the following indications:

w=horizontal dimension of filter
h=vertical dimension of filter
m=image breadth, image line length
n=image height, image column length
y=image block height
x=image block breadth In the method, a two-dimensional filtering operation is divided into successive horizontal and vertical filtering operations by utilizing the properties of separable systems. To begin with, incoming data samples are filtered by lines in the horizontal direction and intermediate results obtained are stored in a memory M1. The intermediate results are read by columns from the memory M1 and exposed to vertical filtering operations. Intermediate results of the operations are stored in a memory M2 by columns.

The data size is assumed to be m*n, which means that the size of the memory required for one operation based on the previously known principle of transposition is m*n memory units, one memory unit being a space required for one data sample in the memory. For example, if 8-bit sample data, having a breadth of 4096 pixels and a height of 4096 pixels, are processed, the size of the memory required for one transposition is 8*4096*4096 bits=128 Mb. The method cannot be used directly for filtering continuous data, since the number of lines n→∞ and therefor also the memory size required approaches infinity.

The memory size required can be decreased by splitting the data into blocks comprising y lines and by performing the vertical filtering operations one block at a time. The first y lines of the horizontal-filtered data are stored in block 1, the next y lines in block 2, etc.

Figure 2:
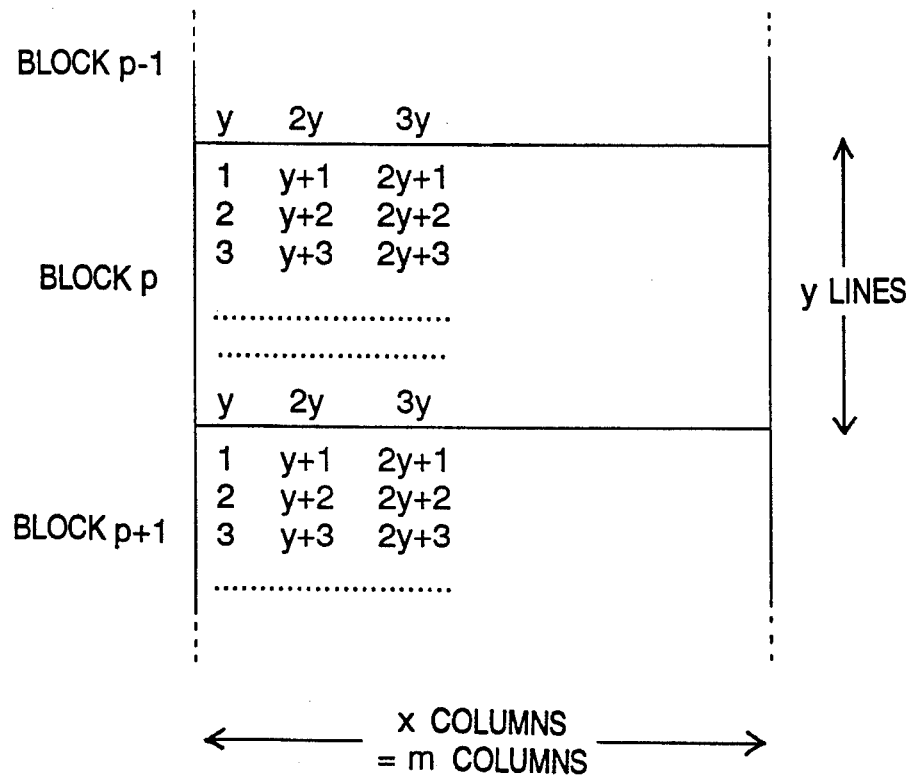
FIG. 2 shows a general view of splitting continuous data into y lines high blocks.

FIG. 2 illustrates this splitting of data into blocks comprising y lines by showing the contents of blocks p−1, p, p+1, in an extent required for making the matter understood.

It is assumed in the following that the samples of block p are stored in the memory M1 and internal states $f(y,p-1)$, $f(2y,p-1), f(3y,p-1), \ldots, f(my,p-1)$ of the vertical filter during the last line of block p−1 in the memory M2.

Before starting processing the first column of block p, the state $f(y,p-1)$ of the last (y'th) line of the corresponding column of block p−1 is loaded from the memory M2 to be the state $f(1,p)$ of the vertical filter. Subsequently, the column is processed until line y. The filter state $f(y,p)$ is stored in the memory M2, and then the filter is loaded with the state $f(2y,p-1)$, and it is proceeded to the processing of column 2. Upon processing the last line y of the last column m, the filter state $f(my,p)$ is stored in the memory M2, the filter is loaded with the state $f(1,p)$, and subsequently, the processing of the first column of block p+1 is started. The processing of block p+1 (as the processing of any other block) is fully identical with the processing of block p.

The order of processing data samples is some sort of an intermediate form between processing data by lines or by columns. Data are processed by columns, but only y samples at a time, and then is proceeded to the processing of the next column. The order of processing samples (numerical order from memory M2) is illustrated in FIG. 3.

For the implementation of the above method in such a way that the two-dimensional filtering remains continuous also in practice, a method for the control of the memory M1 is needed, which makes it possible to store the results of the horizontal filter by lines and to read these results to the vertical filter by columns efficiently. By means of the procedure, a use of separate data transposition algorithms interrupting the continuity is avoided (for example, J. O. Eklundh: A Fast Computer Method for Matrix Transposing. IEEE Trans. Computers, C-21 (July 1972), 801–3) and the memory size required is optimized. Alternative solutions associated with this will be described in the following.

Figures 3, 4:
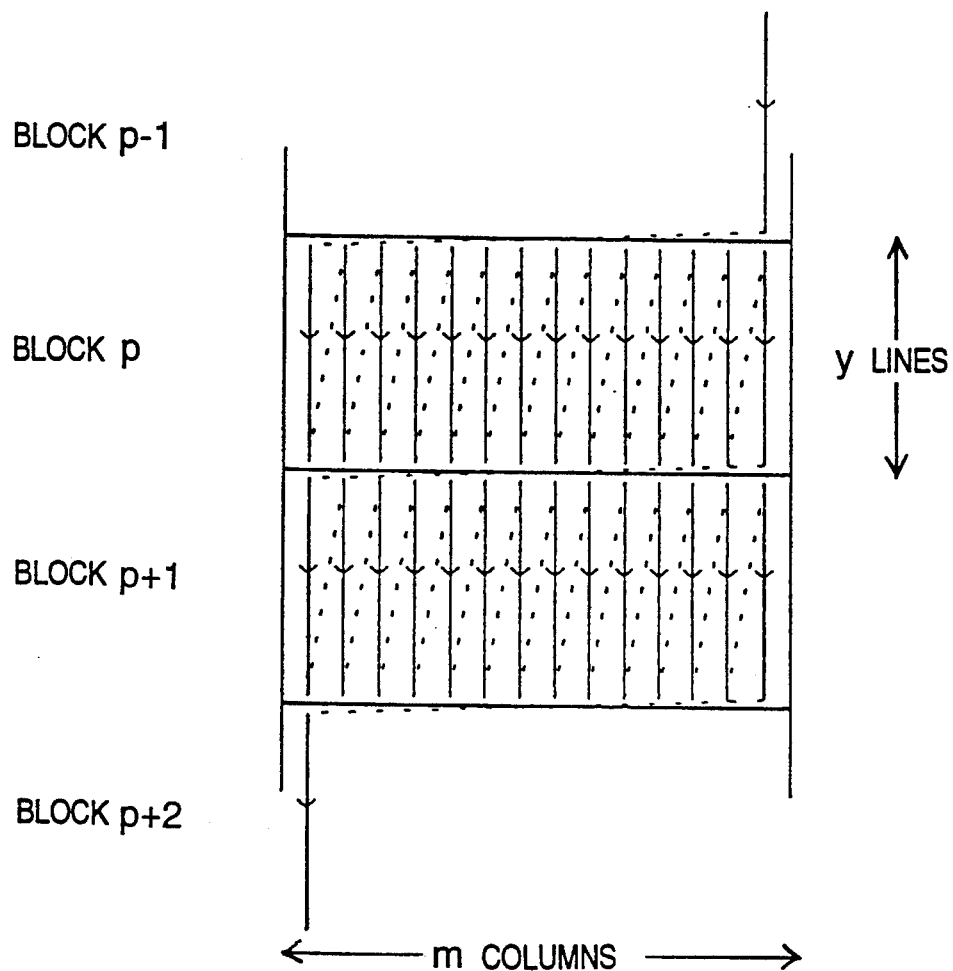
FIG. 3 shows the order of processing data in blockwise vertical filtering.
FIG. 4 shows the order of storing a first data block in a memory after horizontal filtering.

In the manner shown in FIG. 4, y data lines are written to the memory M1 (the size of the memory is y*m, having memory locations [0,m*y−1]) in the order indicated by indices 0 ... m*y−1. The first line is stored in the memory locations [0,m−1], the second line in the memory locations [m,2*m−1], ..., and the last line y in the memory locations [(y−1)*m,y*m−1].

Data are read from the memory M1 by columns. The first column is read from the memory locations 0,m,2m,3m, ... ,(y−2)m and (y−1)m. The second column is read from the memory locations 1,m+1,2m+1,3m+1, ... ,(y− 2)mm+1 and (y−1)m+1, respectively. In a corresponding manner, any column can be read from block p stored in the memory. An address counter stepping by columns is easy to implement on the basis of formula (1)

$$\text{nextadd}(c) = (\text{nextadd}(c-1) + 1) \bmod u, \qquad (1)$$
$$\text{nextadd}(0) = 0, \text{nextad}(m*7 - 1) = u;$$
$$0 < c \leq u,$$
$$u = m*y - 1$$

For the implementation of the memory M1, two alternatives differing from each other are presented below.

Figure 5:
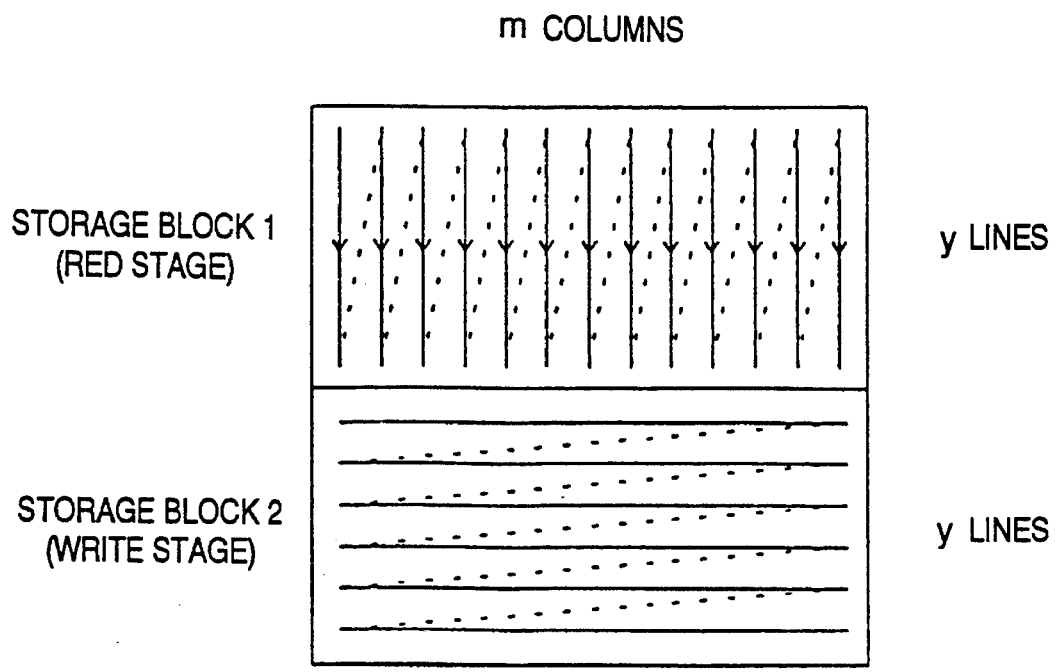
FIG. 5 shows a general view of a first alternative to implement a memory suitable for storing results from horizontal filtering and FIG. 6 shows a block diagram of an illustrative embodiment of an address counter.

In implementation alternative I illustrated in FIG. 5, the size of the memory M1 is 2*m*y memory units, a memory unit signifying the number of storage cells needed for storing one piece of data. Write and read operations are performed simultaneously in two storage blocks 1 and 2. During writing to storage block 1, reading goes on from block 2 or vice versa. Writing is performed by lines (FIG. 5, storage block 2) and reading by columns (FIG. 5, storage block 1). The lowest address of the storage block 2 is 0 and the highest address m*y−1. Correspondingly, the lowest address of the storage block 1 is m*y and the highest 2*m*y−1. The write address jumps after m*y−1 to the address m*y and the read address jumps from 2*m*y−1 to 0, respectively. This means that the storage block having been at read stage is shifted to write stage, and the storage block having been at write stage is shifted to read stage. On the basis of the above, y new lines are written in place of the previously read lines, and y previously stored lines are read. The greatest problem with implementation alternative I is the relatively large memory size required. Since two separate storage areas are needed, the size of the storage capacity will be 2*m*y memory units. Additionally, two separate address counters are needed for generating read and write addresses.

Implementation alternative I can be illustrated by the following example:

Data line length m=4096 pixels

Block height y=16 data samples

Data sample=8 bits=1 byte

Memory size=2*m*y*8 bits=1 Mb=128 kB

Bits in address counters=2*($\log_2$(m*y)) bits =2*16 bits.

In implementation alternative II, the size of the memory M1 is y*m memory units. The operation of implementation alternative II is described below compared with implementation alternative I. It is assumed that a data sample is read from a memory location a in implementation alternative I. After that, the content of the memory location is not needed any more. When reading goes on for instance from the memory location 2*m*y−1 in implementation alternative I, only the area [0,m*y−1]contains usable data. The data contained in the addresses [m*y,2*m*y−1] have then been used once already and are not needed any more. On the basis of this, only half of the content of the memory is usable data.

By virtue of the above, the size of the memory required for a transposition of blockwise data can be decreased from 2*m*y to m*y. This again presupposes that each write operation is performed to the same address from which the preceding data sample was read.

It is assumed that y data lines (lines 0. . . y−1) are stored in a memory [0,m*y−1] in the manner shown in FIG. 4. Initially, column 0 is read, and simultaneously, the first y data samples of line y are stored in the memory locations becoming free. The next y data samples of the line are stored in column 1. Upon reading m/y columns, the storage of line y+1 may be started. Upon reading the last data sample of line y−1, the last data sample of line 2*y−1 may be stored in place thereof.

The next step is that the first data samples (column 0) of lines y,y+1,y+2, . . . ,2*y−1 are read from the memory, and the first part of line 2*y is stored in place of the samples taken. Then the second data samples (column 1) of the lines y,y+1,y+2, . . . ,2*y−1 are read and the next y data samples of line 2*y are stored in place thereof. The process is continued in this way and the procedure enables a continuous processing of infinite multiline data.

The above procedure requires an address generating algorithm developed for this purpose and described below. During processing the first data block, the address is continuously incremented by one. Upon termination of the data block, the increment is m (length of data line), whereby formula 2 modified from formula 1 may be used for address counting.

$$\text{nextadd}(c) = (\text{nextadd}(c-1) + \text{increment}) \bmod (u - 1), \qquad (2)$$
$$\text{nextadd}(m*y) = 0, \text{nextadd}(2*m*y - 1) = u - 1,$$
$$U < c \leq 2u - 1,$$
$$u = m*y,$$
increment = m At the second cycle, the increment is m, indicating the location of the first column of the second data line of the first data block in the memory M1. At the third cycle, formula 2 can still be applied with the difference that the set increment value is the location of the first column of the second data line of the second data block in the memory M1. Generalized, as an increment of block p−1 (in formula 2) is used the value of the address contained in the first column of the second data line of block p−1 in the memory M1. The increment value of block p could be calculated arithmetically from the increment of block p−1, but rather much calculation is required for this measure in practice. A considerably easier manner is to store, during processing block p−1, the address of the first column of the second data line of block p−1 in a register REGA in the manner shown in FIG. 6. When the processing of block p is started, a new increment value will be loaded and it is the content of the register REGA. Thanks to this measure, a heavy calculation is avoided. Address counting can be implemented for instance by means of a solution of the kind shown in FIG. 6, for instance.

Figure 6:
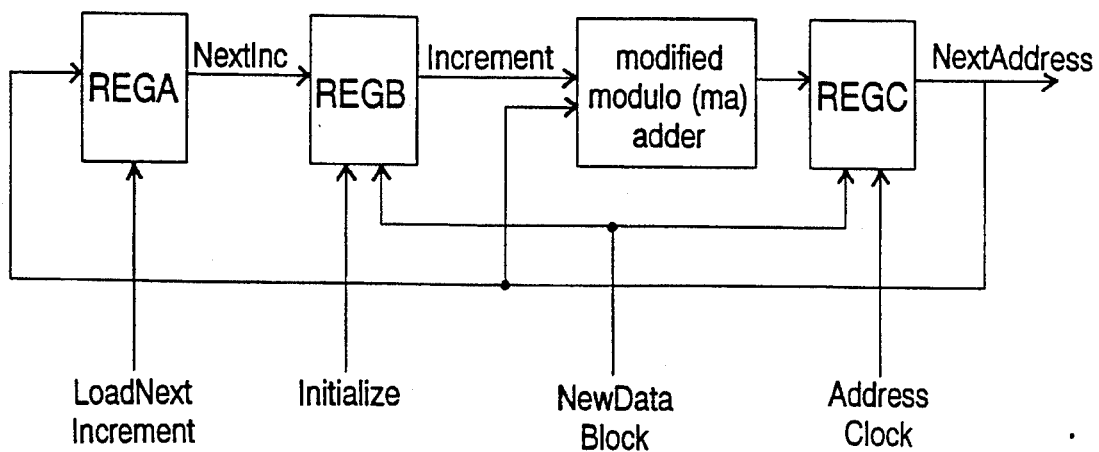

The illustrative structure of an address counter shown in FIG. 6 comprises four separate parts:

REGA: a register containing an address of the first column of the second line of a data block.

REGB: a register containing an increment to be used in the data block.

REGC: a register containing an initial address.

Adder: a modified modulo(ma) adder (ma=LL*y− 1). The part calculates a total sum=(A+B) mod (ma), except in a situation where (A+B)=ma, in which case the total sum=A+B, when A is the content of the register REGA, B is the content of the register REGB and ma is the number of the memory units of the block subtracted by one.

In the beginning of an operating sequence, an Initialize signal is activated. In the beginning of a new data block (and in this case also in the beginning of the whole data), an Increment value 1 is loaded by means of a NewDataBlock signal and the NextAddress value of the initial address is set to 0. Subsequently, the Initialize signal is set to a non-active state.

The NewDataBlock signal to be activated in the beginning of each data block sets the initial address to zero (Next-Address=0) and loads a new increment (Increment= NextIncrement). After this, addresses are counted in sync with an AddressClock. The address of the first column of the second line of the data block is stored by means of a LoadNextIncrement signal in the register REGA.

We claim:

1. A method of continuous two-dimensional filtering of discrete m*n data to be processed comprising n lines each containing m data samples, wherein filtering is performed as successive horizontal and vertical filtering operations, data being stored in connection with horizontal and vertical filtering in a first memory and a second memory, respectively, and wherein data is divided for the processing into blocks comprising y lines, said method comprising the steps of:

(a) filtering a data block comprising y lines in the horizontal direction, (b) storing the results of the horizontal filtering by lines in the first memory, the memory each time containing y stored lines of the results of the horizontal filtering, (c) reading the results of the horizontal filtering from the first memory by columns along the length of the block, d) filtering the results read from the first memory by columns in the vertical direction, which results of the vertical filtering constitute filtered data, e) storing intermediate states of the vertical filtering in the second memory, upon processing the y lines of each column, f) reading from the second memory, before the vertical filtering of next block, the y lines earlier state of the corresponding column to be the initial value of the vertical filtering, and g) continuing the blockwise processing until n data lines have been filtered.

2. A method according to claim 1, wherein the results of the horizontal filtering are initially written to successive memory locations until all memory locations are in use, and subsequently, the results are written in place of the content of the memory location just read to the vertical filtering.

3. A method according to claim 1, wherein the storing of the intermediate states of the vertical filtering in the memory and the reading of the values from the memory to be the initial values of the vertical filtering are combined by changing the contents of the memory locations to be read for those to be stored.

4. A filter for continuous two-dimensional filtering of discrete m*n data, data to be processed comprising n lines each containing m data samples, said filter comprising:

a) a horizontal filter and a vertical filter for performing the filtering as successive horizontal and vertical filtering operations for data divided for the processing into blocks comprising y lines, wherein data input to the vertical filter are derived from the horizontal filter output, (b) a first memory for storing horizontal-filtered data to be received from the horizontal filter, (c) a second memory for storing internal intermediate states of the vertical filter, and (d) a timing and synchronizing block for:
1) generating address signals and control signals for storing in the first memory by lines and for reading from the first memory by columns,
2) storing the intermediate states of the vertical filtering in the second memory, and
3) reading the intermediate states from the second memory.

5. A filter according to claim 4, wherein the size of the first memory is 2*m*y memory units divided into two parts in size of m*y, one of said parts each time serving as a write memory, to which data is written by lines, and the other one of said parts serving as a read memory, from which data is read by columns.

6. A filter according to claim 4, wherein the size of the second memory is m*y memory units.

7. A filter according to claim 4, wherein the size of the first memory is m*y memory units, a content of a new memory location being immediately written in place of the content of the memory location read each time.

8. A filter according to claim 7, wherein the timing and synchronizing block for generating addresses for the first memory comprises an address counter, comprising a first register containing the address of the first column of the second line of a data block, a second register containing an increment used in the data block, a modified modulo(ma) adder, calculating a total (A+B)mod(ma), where A is the content of the first register, B is the content of the second register and ma is the number of the memory units of the block subtracted by one, except in a situation when (A+B)=ma, in which case the total is A+B, and a third register containing an initial address.

* * * * *

UNITED STATES PATENT AND TRADEMARK OFFICE
CERTIFICATE OF CORRECTION

PATENT NO. : 5,485,412
DATED : January 16, 1996
INVENTOR(S) : Timo Sarkkinen et al.

It is certified that error appears in the above-identified patent and that said Letters Patent is hereby corrected as shown below:

On title page, item [30], "Foreign Application Priority Data"

change,

"[JP] Japan" to --[FI] Finland--

Signed and Sealed this

Eighteenth Day of June, 1996

Attest:

BRUCE LEHMAN

*Attesting Officer*  *Commissioner of Patents and Trademarks*